US012771190B2

(12) United States Patent
Chernogorski

(10) Patent No.: US 12,771,190 B2
(45) Date of Patent: Oct. 20, 2026

(54) MOTOR VEHICLE HAVING AN ELECTRIC MACHINE HAVING A ROTOR INTERNAL TO A STATOR, THE STATOR HAVING COOLING CHANNELS

(71) Applicant: AUDI AG, Ingolstadt (DE)

(72) Inventor: Vladimir Chernogorski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 170 days.

(21) Appl. No.: 18/601,905

(22) Filed: Mar. 11, 2024

(65) Prior Publication Data

US 2024/0313592 A1 Sep. 19, 2024

(30) Foreign Application Priority Data

Mar. 14, 2023 (DE) ......................... 102023106331.6

(51) Int. Cl.
*H02K 1/20* (2006.01)
*H02K 9/197* (2006.01)

(52) U.S. Cl.
CPC ............... *H02K 1/20* (2013.01); *H02K 9/197* (2013.01)

(58) Field of Classification Search
CPC ............ H02K 1/20; H02K 9/19; H02K 9/193; H02K 9/197
See application file for complete search history.

(56) References Cited

U.S. PATENT DOCUMENTS

| | | | | |
|---|---|---|---|---|
| 4,994,700 A * | 2/1991 | Bansal | H02K 3/48 310/60 A |
| 2004/0012294 A1* | 1/2004 | Rippel | H02K 1/20 310/60 A |
| 2018/0054097 A1* | 2/2018 | Dlala | H02K 1/16 |
| 2022/0045576 A1 | 2/2022 | Druant et al. | |

FOREIGN PATENT DOCUMENTS

| | | | | |
|---|---|---|---|---|
| CN | 115459501 A | 12/2022 | |
| DE | 10-2019-124345 A1 | 3/2020 | |
| DE | 10-2021-214491 A1 | 6/2022 | |
| DE | 10-2021-102429 A1 | 8/2022 | |
| EP | 3157138 A1 | 4/2017 | |
| EP | 4145677 A1 * | 3/2023 | H02K 9/19 |
| WO | WO 2019110273 A1 | 6/2019 | |

* cited by examiner

*Primary Examiner* — Tulsidas C Patel
*Assistant Examiner* — Robert E Mates
(74) *Attorney, Agent, or Firm* — Seed Intellectual Property Law Group LLP

(57) ABSTRACT

An electric machine, designed as an internal rotor and including a rotor and a stator, is provided, the stator having a plurality of teeth each extending along a radial direction and along a longitudinal direction of the electric machine, each of the teeth carrying a winding wound around them, stator slots extending between two adjacent teeth and along the longitudinal direction being provided through which the windings extend, the windings being coolable by a cooling fluid which can be guided in a plurality of cooling channels formed in the stator and extending along the stator slots, at least one section of at least one of the plurality of windings running between the cooling channels in such a way that this section can be cooled on both sides.

13 Claims, 4 Drawing Sheets

MOTOR VEHICLE HAVING AN ELECTRIC MACHINE HAVING A ROTOR INTERNAL TO A STATOR, THE STATOR HAVING COOLING CHANNELS

BACKGROUND

Technical Field

The present disclosure relates to an electric machine, designed as an internal rotor and including a rotor and a stator. The present disclosure further relates to a stator for an electric machine designed as an internal rotor and including a rotor and the stator. The present disclosure also relates to a motor vehicle including an electric machine.

With regard to a housing of the electric machine, the electric machine includes a fixed stator or stand and a rotor that is rotatably mounted about an axis of rotation. Since the electric machine described herein is designed as an internal rotor, the rotor is arranged, relative to its axis of rotation, in an area radially further inwards than the stator.

Description of the Related Art

In electric machines there is a need for cooling of the current-carrying components, such as the electrical conductors that form windings. To operate the electric machine, the windings or conductors are energized by an electrical current, which causes the machine to heat up. For example, the document DE 10 2019 124 345 A1 discloses an electric machine with a cast or extruded electrical conductor for a stator or rotor, the current conductor designed as a conductor bar having cooling channels for guiding a coolant.

BRIEF SUMMARY

Embodiments of the present disclosure provide an improved concept with regard to cooling in an electric machine.

Some embodiments provide an electric machine of the type mentioned at the outset in that the stator has a plurality of teeth each extending along a radial direction and along a longitudinal direction of the electric machine, each of the teeth carrying a winding wound around them, stator slots extending between two adjacent teeth and along the longitudinal direction being provided through which the windings extend, the windings being coolable by a cooling fluid which can be guided in a plurality of cooling channels formed in the stator and extending along the stator slots, at least one section of at least one of the plurality of windings running between the cooling channels in such a way that the at least one section can be cooled on both sides.

The present disclosure is based on the idea that the fact that the respective winding or the section that is arranged between the cooling channels can be cooled on both sides will result in a more efficient cooling effect compared to the case in which the winding or this section is arranged adjacent to only a single cooling channel. The specific arrangement of the winding between the cooling channels advantageously means that the heat generated in the area of the winding is dissipated over several sides or in several directions. Heat-conducting components or sections are heated to a lesser extent, which ensures better heat flow.

In some embodiments, the cooling fluid cannot be guided through the winding or, in other words, can only be outside the winding. On the one hand, this simplifies the structure of the winding, while on the other hand, even so, a sufficient cooling effect is achieved. For example, it can be provided that a conductor wire forming the winding has a full cross section. This means that the conductor wire does not have a cooling channel running along its longitudinal direction. Conductor wires with hollow cross-sections are more difficult to handle than is the case with conductor wires with a full cross-section when producing the electric machine, such as when winding around the respective tooth using a winding needle, such as due to their mechanical rigidity.

The at least one conductor wire includes an electrically conductive material, such as a metal, such as copper. The cooling fluid is a cooling liquid, such as water or oil.

Definitions of relevant spatial directions in the electric machine described herein are introduced below. For example, a rotor shaft of the rotor is rotatably mounted about an axis of rotation, which extends along a longitudinal direction of the electric machine. The radial direction extends perpendicular to the longitudinal direction. A circumferential direction is in turn perpendicular to the radial direction. This means that a point rotating about the axis of rotation moves along the circumferential direction. If one of these directions is mentioned without specific reference, it refers to the electric machine according to the definitions just introduced. The longitudinal, radial, and circumferential directions with regard to the rotor and stator correspond to the longitudinal, radial, and circumferential directions with regard to the electric machine.

With regard to the cross section of the winding and the cooling channels, it is conceivable that the cooling channels are arranged, such as diametrically, opposite one another on the winding. It is therefore conceivable that the cooling channel, relative to the radial direction, is arranged on the top and bottom or on the left and right sides next to the winding. Cooling on both sides along an oblique direction is also conceivable. In any case, the longitudinal direction of the cooling channels extends along the longitudinal direction. In order to further optimize the cooling effect, it can be provided that the cooling channels and the winding or the section thereof, which is arranged between the cooling channels, extend over the entire longitudinal extent of the stator.

Optional aspects regarding the windings are explained below. An independent winding can be wound around each of the teeth. This means that concentrated windings are provided, which are formed by separate windings of the teeth. It can be provided here that each of the windings is formed from exactly one conductor wire. This means that the conductor wire is wound continuously around the respective tooth, wherein end pieces of the conductor wire can protrude from the winding, via which electrical contacting of the winding is realized or made possible. Alternatively, the winding may be formed from a plurality of conductor wires, which can be electrically connected in series via connecting pieces.

The winding, such as a so-called toothed coil winding, may be a distributed winding. This means that the conductor wire forming the windings is incorporated in different stator slots over a plurality of teeth. In at least one embodiment, the winding or its section extending through the stator slot extends, relative to the radial direction, over the entire lateral width of the stator slot and completely fills it.

In the electric machine described herein, it can be provided that the windings are each elongated along the longitudinal direction. In this case, the windings can each have two longitudinal sections which extend at least in sections along the longitudinal direction and two transverse sections which connect the longitudinal sections to one another and extend transversely to the longitudinal direction. The longitudinal sections extend through one of the rotor slots in each case. The transverse sections extend perpendicular to the longitudinal and radial directions. The term "elongated" in this context means that the longitudinal sections can be more than twice, such as more than five times, and in some embodiments more than ten times, as long as the transverse sections. The windings can each have two winding heads. The winding heads each form that area of the respective winding that connects its longitudinal sections to one another. Typically, the winding heads protrude from the respective tooth in the axial direction. The winding heads each include one of the cross sections.

With regard to the stator, it can be provided that it is formed from a laminated core, on the radial inside of which the radially inwardly pointing teeth are arranged or are formed by the laminated core. Each of the areas between two adjacent teeth forms one of the stator slots. In some embodiments, the stator slots may be each substantially rectangular, relative to their cross section, wherein the width of the stator slot can decrease radially inwards.

The stator slots can each be closed radially on the outside and delimited by a slot base, which can also be referred to as a slot bottom. With regard to the radial inside, i.e., towards the rotor, the stator slots can each be open. The radially inner section of the respective stator slot can form a so-called leakage slot, which is open towards the inside diameter of the stator. The teeth can have flanks or shoulders radially on the inside, so that the teeth are widened laterally on the inside, relative to the radial direction. The area of the stator slot that extends radially between the slot base and the shoulders can form a receiving space for the winding. Relative to the radial direction, the windings can completely fill the stator slots, relative to their lateral width. The area of the respective stator slot that is located radially further inward than the shoulders or, in other words, the area of the respective stator slot that extends between the widened sections can form the leakage slot. In some embodiments, the leakage slot may be free of any components, such as free of the windings, and is therefore left void, apart from the cooling fluid.

In the case of the electric machine, it is conceivable that the electric machine has at least one radially outer cooling channel and at least one radially inner cooling channel. This means that the radially outer cooling channel extends through a region of the stator that is further outward relative to the radial direction than the radially inner cooling channel. The at least one radially outer cooling channel can run directly adjacent to a radially outer section and the at least one radially inner cooling channel can run directly adjacent to a radially inner section of the respective winding. In some embodiments, the cross section of the windings may each have a greater extent along the radial direction than along the circumferential direction. In this case, cooling on both sides along the radial direction is particularly advantageous.

Provision can be made for the radially outer cooling channel to be arranged radially adjacent to and radially further outward than a slot base of the stator slot. The radially outer cooling channel can run through the laminated core. The radially outer cooling channel may be arranged directly adjacent to the slot base of the stator slot. This means that, relative to the radial direction, the distance between the radially outer cooling channel and the slot base can be less than 10%, such as less than 5%, of the distance between the radially outer cooling channel and a radially outer surface of the stator or the laminated core.

The stator slot and the radially outer cooling channel can be arranged collinearly along the radial direction. In some embodiments, the radially outer cooling channel or at least one further radially outer cooling channel may be arranged laterally adjacent to the slot base of the stator slot. Relative to the circumferential direction, the stator slot or the slot base and the radially outer cooling channel or the further radially outer cooling channel may be arranged offset from one another. The radially outer cooling channel or the further radially outer cooling channel, which may be arranged laterally adjacent to the slot base, runs centrally between two adjacent teeth. The cooling effect of this radially outer cooling channel therefore has an impact on the two adjacent stator slots or the windings arranged therein.

The radially outer or further radially outer cooling channel arranged laterally adjacent to the slot base can extend so far inwards and outwards, relative to the radial direction, that it overlaps the stator slot. With regard to the radially outer cooling channel or the further radially outer cooling channel, which is arranged laterally adjacent to the slot base, it can be provided that it runs through the laminated core and/or, if it overlaps the stator slot, through one of the teeth.

With regard to the radially inner cooling channel, it is provided that it runs through a radially inner section of the stator slot that forms the leakage slot. In this embodiment, the cooling fluid flows directly along the respective winding, so that the cooling efficiency is further increased. The winding can be encased at least in sections by an insulating paper, such as impregnated insulating paper, in order to avoid direct contact between the winding or the conductor wire and the cooling fluid. Furthermore, the insulation paper makes it possible for an impregnation resin to be injected into the area of the windings in order to avoid air pockets that would otherwise be present there.

A sleeve arranged on a radial inner circumference of the stator is provided, which seals the radially inner cooling channel in a fluid-tight manner towards an air gap which is arranged between the stator and the rotor. In this embodiment, it is provided that the radially inner cooling channel formed by the leakage slot may be delimited radially on the inside by the stator sleeve, radially on the outside by the winding or the insulation paper, and laterally by mutually adjacent teeth.

The sleeve expediently includes a fluid-tight material, a metal such as a steel sheet, or of a carbon material or of a plastic material or of a composite material. With regard to the production of the electric machine, it can be provided that the prefabricated and seamless sleeve is inserted along the longitudinal direction into a corresponding rotor receiving space of the stator. Scaling means such as sealing strips for sealing the radially inner cooling channels can be arranged between the sleeve and the radial inside of the teeth.

In the case of the electric machine, it can be provided that the electric machine has a cooling system in which the cooling fluid can be supplied to and discharged from the cooling channels. The cooling system can form a cooling circuit in which the cooling fluid can be conveyed by a conveying device. Accordingly, the cooling fluid circulates from the conveying device to the cooling channels and back again, that is to say, it is circulated. The conveying device can be a cooling fluid pump. A cooling device for cooling the cooling fluid, such as a heat exchanger, can be integrated into the cooling system.

With regard to the cooling system, it can be provided that the supply and discharge of the cooling fluid to or from the cooling channels takes place at a supply section which is arranged on the front side of one of the two axial end sections of the stator. The supply and discharge of the cooling fluid to or from the cooling channels or the stator can therefore be implemented by a common connection interface and therefore with correspondingly little effort.

In some embodiments, it is provided that at least one of the cooling channels may be a supply channel and at least one of the cooling channels may be a discharge channel, with the cooling fluid in the supply channel flowing in an opposite direction relative to the discharge channel. The cooling fluid can thus be guided along the stator's longitudinal direction through the supply channel from one axial end section to the other and back again via the discharge channel. Accordingly, the supply section opens into the supply channel and the discharge channel opens into the supply section. The supply channel and/or the discharge channel extends along the entire longitudinal extent of the stator.

A supply chamber and a discharge chamber may be arranged in the area of the supply section. Furthermore, a transfer chamber may be arranged on the front side of the stator in the area of a transfer section. The transfer section is the axial end section of the stator opposite the supply section. The supply chamber and/or the discharge chamber and/or the transfer chamber may be formed from sections of the housing that delimit these chambers at least in sections in each case.

With regard to the cooling system designed as the cooling circuit, it can be provided that it has a supply line leading from the conveying device to the stator and a discharge line leading from the stator to the conveying device. The supply line arranged downstream of the conveying device can thus open into the supply chamber. The supply chamber can open into the supply channel, with the supply channel in turn opening into the transfer chamber. With regard to the transfer chamber, it can be provided that it opens into the discharge channel. The discharge channel in turn can open into the discharge chamber, wherein the discharge chamber can open into the discharge line arranged upstream of the conveying device.

With regard to the supply chamber and the discharge chamber, it can be provided that these chambers are fluidically separated from one another via a sealing ring arranged in the supply section. The sealing ring can extend concentrically about the axis of rotation of the electric machine, so that the supply and discharge chambers also extend eccentrically about the axis of rotation. In at least one embodiment, a common supply chamber and a common discharge chamber are implemented, with all supply channels branching off from the supply chamber and all discharge channels opening into the discharge chamber. Accordingly, a common transfer chamber may also be provided, into which all supply channels open and from which all discharge channels branch off.

The sealing ring can be made of metal or plastic. The sealing ring can be supported, by appropriate sealing elements, on the housing sections delimiting the respective chambers and thereby additionally delimit these chambers. The sealing elements can be O-rings, for example, made of an elastomer. The sealing ring can extend at least in sections along the longitudinal direction and/or along the radial direction and/or obliquely thereto. The supply chamber can extend at least in sections into an area located radially further inward than the discharge chamber, or vice versa.

If the windings each have winding heads, then it is provided that one of the winding heads of at least one of the windings is arranged in the transfer chamber. The other winding head of this winding can be arranged in the supply chamber and/or in the discharge chamber. This creates a cooling effect with regard to the winding heads, so that the cooling effect with regard to the entire winding is also improved. The respective winding head can be encapsulated in the respective chamber. In some embodiments, the chamber housing one of the winding heads may be flooded by the cooling fluid, such as completely or at least up to a maximum level. This further improves the cooling effect on the winding heads.

In some embodiments, at least one winding carrier arranged around or on one of the teeth and guiding the winding is provided. The structure of the winding is defined by the winding carrier. The winding carrier, which can be made of plastic, can have guide slots for securely and stably receiving or guiding the conductor wire. The winding carrier can consist of several pieces. In some embodiments, the respective winding carrier may have two winding carrier components which are arranged or fastened on the axial front ends of the respective tooth. If the winding carrier is provided, the cooling fluid can be conducted from the supply chamber into the supply channel and/or from the supply channel into the transfer chamber and/or from the transfer chamber into the discharge channel and/or from the discharge channel into the discharge chamber through at least one fluid guide channel of the winding carrier.

The present disclosure also relates to a stator for an electric machine designed as an internal rotor and including a rotor and the stator, having a plurality of teeth each extending along a radial direction and along a longitudinal direction of the stator, each of the teeth carrying a winding wound around them, stator slots being provided in each case extending between two adjacent teeth and along the longitudinal direction, through which the windings extend, the windings being coolable by a cooling fluid which can be guided in a plurality of cooling channels formed in the stator and extending along the stator slots, at least one section of at least one of the plurality of windings running between the cooling channels in such a way that this section can be cooled on both sides. All advantages and features explained in connection with the electric machine according to the invention can be equally transferred to the stator according to the invention, and vice versa.

The present disclosure further relates to a motor vehicle including an electric machine as described above. All of the features and advantages explained in connection with the electric machine described herein and the stator described herein are equally transferable to the motor vehicle described herein, and vice versa.

The electric machine may be connected to a drive train of the motor vehicle or may be a component thereof, so that torque can be transferred from the electric machine to the wheels of the motor vehicle, and/or vice versa. In some embodiments, the rotor or a rotor shaft of the rotor, which forms an input and/or output shaft of the electric machine, may be coupled to a drive train of the motor vehicle, so that a rotation of the rotor or the rotor shaft is transmitted to components of the drive train, and vice versa. In addition to a drive shaft and the wheels, the drive train includes other components that enable torque transmission between the electric machine and the wheels of the motor vehicle, such as a transmission and/or a clutch and/or a differential or the like. Details in the regard are well known to those skilled in the art and will not be explained in more detail here.

The electric machine can be operable in a drive mode in which it generates a traction torque to drive the motor vehicle. In this mode, the electrical energy stored in an electrical energy storage unit of the motor vehicle is converted into kinetic energy of the motor vehicle by the electric machine. The accelerating or positive torque generated by the electric machine is transmitted to the drive train and therefore to the wheels. Specifically, the windings are electrically energized using the energy stored in the electrical energy storage unit, whereby magnetic fields are induced by the windings. These magnetic fields interact with magnetic fields of other coils or permanent magnets of the electric machine in such a way that the rotation of the rotor and thus the positive torque is generated.

The electric machine can be operable in a recuperation mode in which it generates a deceleration torque for decelerating the motor vehicle. In this mode, the kinetic energy of the motor vehicle is converted into electrical energy by the electric machine, which electrical energy can be stored in the electrical energy storage unit of the motor vehicle and/or can be used for operating electrical devices of the motor vehicle. For this purpose, the decelerating or negative torque of the rotor is transmitted to the drive train and via said drive train to the wheels. Specifically, the magnetic fields of further coils or permanent magnets cause the induction of an electrical current in the windings, with the corresponding electromagnetic interaction causing the negative torque and the current induced in the windings can be used, for example, to charge the electrical energy storage unit.

BRIEF DESCRIPTION OF THE SEVERAL VIEWS OF THE DRAWINGS

Further advantages and features are apparent from the embodiments explained below and from the figures.

DETAILED DESCRIPTION

Figure 1:
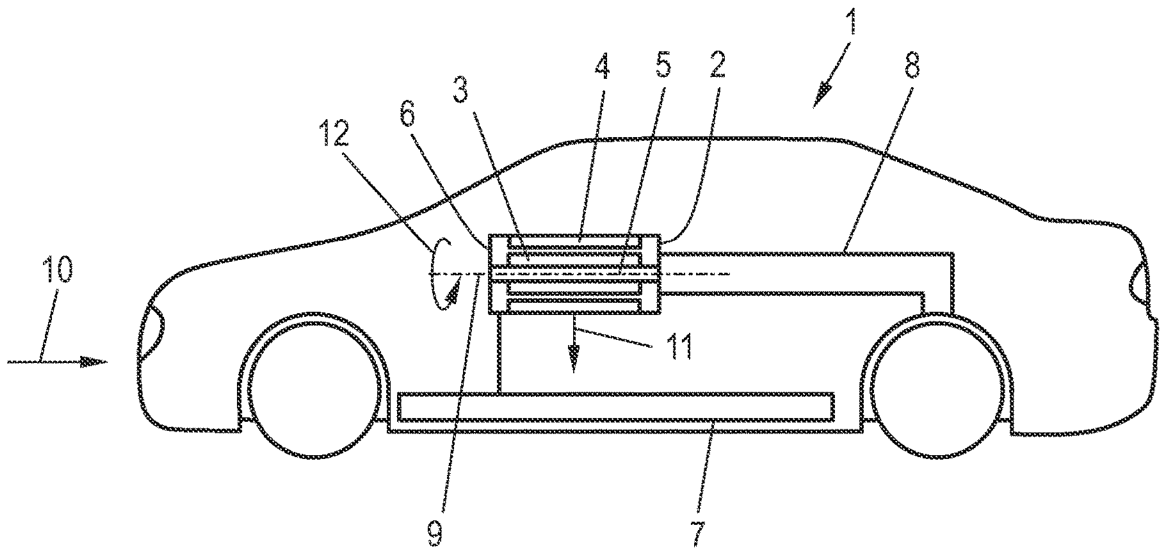
FIG. 1 shows a schematic diagram of an embodiment of a motor vehicle, including an embodiment of an electric machine with an embodiment of a stator.

FIG. 1 shows a motor vehicle 1 according to an embodiment, comprising an electric machine 2 described herein according to an embodiment. The electric machine 2 comprises a rotor 3 and a stator 4 described herein according to an embodiment. The electric machine 2 is an internal rotor. This means that the rotor 3 is arranged in an area of the electric machine 2 that is radially further inside than an area in which the stator 4 is arranged. A rotor shaft 5 of the rotor 3 is rotatably mounted on a housing 6 of the electric machine 2, for example, by a ball or roller bearing.

The electric machine 2 is configured to be operated in a drive mode in which electrical energy stored in an electrical energy storage unit 7 of the motor vehicle 1 is converted into kinetic energy of the motor vehicle 1. A generated drive torque, which is used to propel the motor vehicle 1, is transferable from the electric machine 2 to a drive train 8 of the motor vehicle 1. The drive torque is transferable only to the rear wheels, but can also or alternatively be transferable to the front wheels. The electric machine 2 is also operable in a recuperation mode, in which kinetic energy of the motor vehicle 1 is converted into electrical energy by the electric machine 2, which electrical energy can be used, for example, to charge the electrical energy storage unit 7.

Below, with regard to the electric machine 2, definitions regarding relevant spatial directions are introduced. For example, the rotor shaft 5 is rotatably mounted about an axis of rotation 9, which extends along a longitudinal direction 10 of the electric machine 2. A radial direction 11 extends perpendicular to the longitudinal direction 10. A circumferential direction 12 is perpendicular to the radial direction 11. This means that a point rotating about the axis of rotation 9 moves along the circumferential direction 12.

Figure 2:
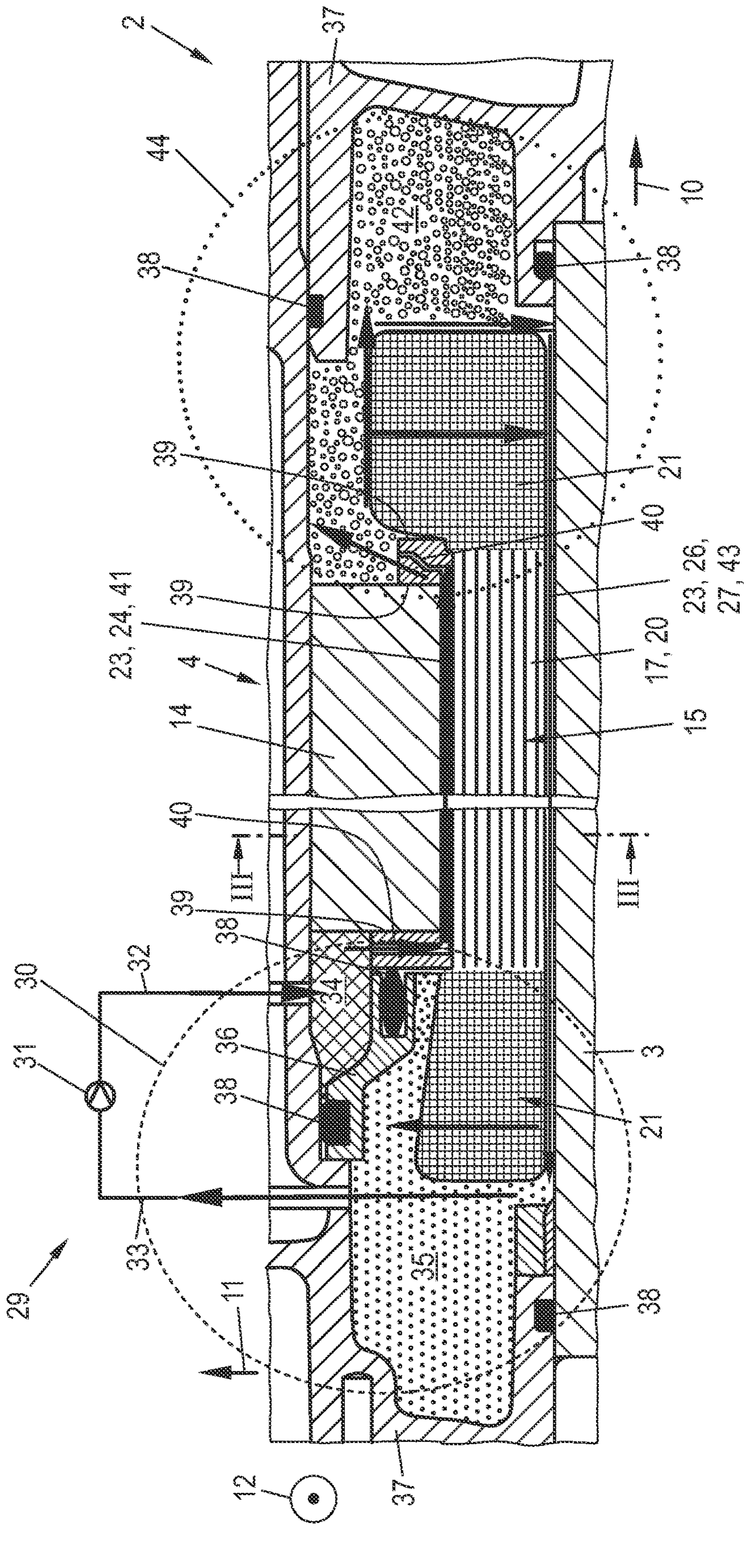
FIG. 2 shows a longitudinal section through an upper part of the electric machine of the motor vehicle of FIG. 1.
Figure 3:
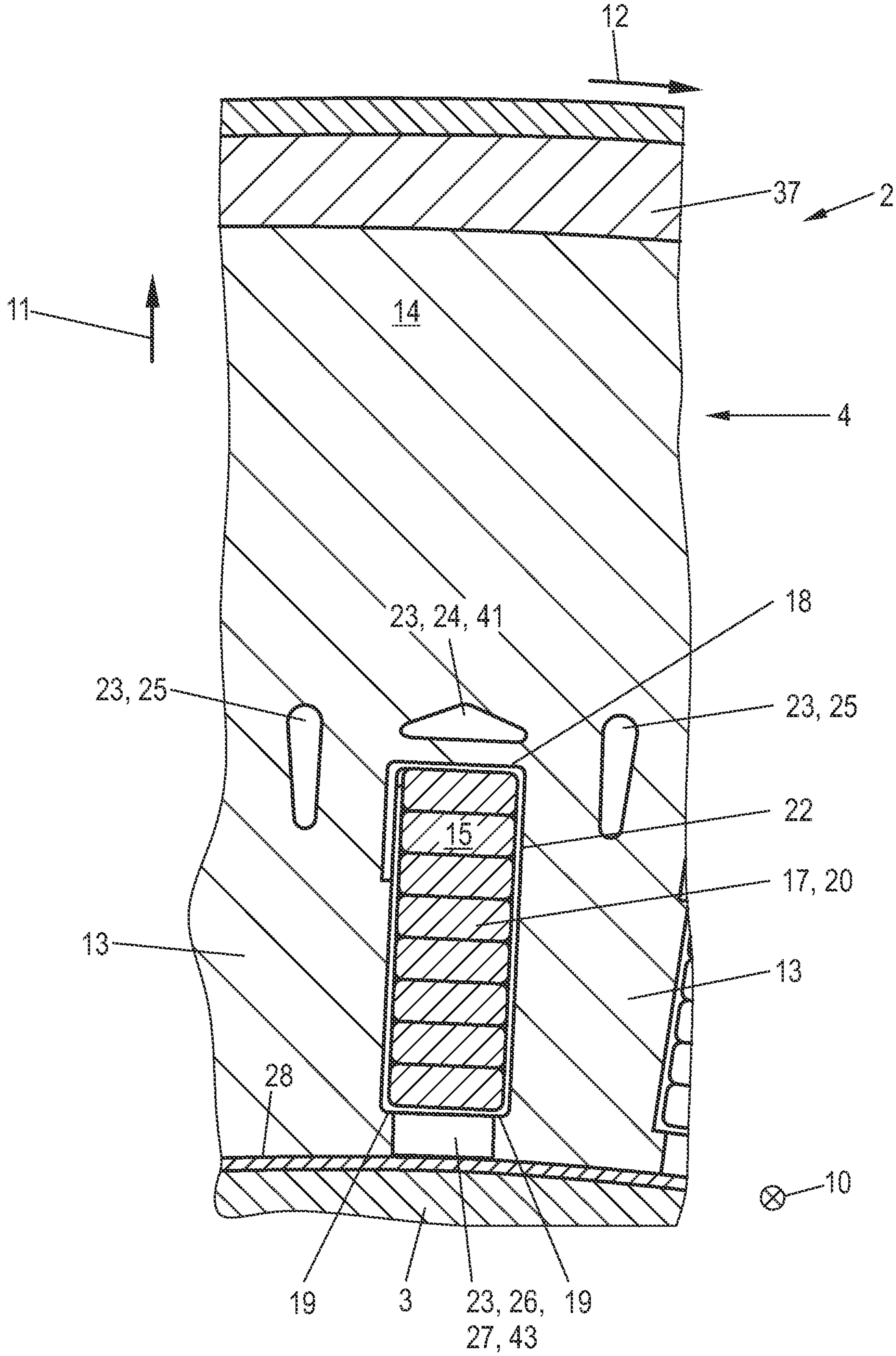
FIG. 3 shows an enlarged representation of a cross section of the electric machine of the motor vehicle of FIG. 1, the corresponding section line in FIG. 2 being arranged by III-III.

Details regarding the stator 4 are explained below with reference to FIGS. 2 and 3. FIG. 2 shows a sectional view of an upper section of the stator 4, the sectional plane running along the axis of rotation 9. The stator 4 is symmetrical with regard to the axis of rotation 9. FIG. 3 shows a sectional view of a segment of the stator 4, the sectional plane being perpendicular to the axis of rotation 9.

The stator 4 is formed from a laminated core 14, which also forms teeth 13 that project radially inwards. The teeth 13 extend, as can be seen from FIGS. 2 and 3, along the longitudinal direction 10 and along radial direction 11. A stator slot 15, which can be seen in FIG. 3, is formed between two adjacent teeth 13, the cross section of which is designed to be rectangular and elongated along the radial direction 11. A winding 17 formed from an electrically conductive conductor wire 16 is wound around each of the respective teeth 13. The winding 17 completely fills respective the stator slot 15 from a slot base 18 to a shoulder 19 of each of the respective teeth 13. The slot base 18 is located at the radially outer end of the respective stator slots 15. The shoulders 19 are formed from a widened section of the respective adjacent teeth 13 located radially on the inside.

The windings 17 can be concentrated windings. In the present case, however, it is provided that the windings 17 form a distributed winding. This means that the conductor wire 16 is alternately guided through different stator slots 15 or, in other words, that the conductor wire 16 forming the windings 17 is incorporated into different stator slots 15 over several teeth 13.

The windings 17 each comprise a longitudinal section 20 which extends through the respective stator slot 15 and along the longitudinal direction 10 and two winding heads 21 which protrude from the axial ends of each tooth 13 and which connect the two longitudinal sections 20 to one another. The windings 17 are encased by an impregnated insulation paper 22.

In the electric machine 2, it is provided that the windings 17 are coolable by a cooling fluid which can be guided in cooling channels 23. Essentially, at least one section of each respective winding 17, in present case the longitudinal section 20, is located between a plurality of cooling channels 23 in such a way that this section of respective windings 17 are coolable on both sides. From FIG. 3 it can be seen that each respective winding 17 and the correspondingly associated cooling channels 23 are arranged relative to one another in such a way that the winding 17 in this section is coolable on both sides with regard to the radial direction 11.

Details with regard to the cooling channels 23 will be explained below with reference to FIG. 3. A radially outer cooling channel 24, a further radially outer cooling channel 25, and a radially inner cooling channel 26 are provided for each stator slot 15. The radially outer cooling channels 24, 25 cool each respective winding 17 from the outside relative to the radial direction 11. The radially inner cooling channel 26 cools each respective winding 17 from the inside, relative to the radial direction 11. In other words, the radially outer cooling channels 24, 25 run directly adjacent to a radially outer section, and the radially inner cooling channel 26 runs directly to a radially inner section of each respective winding 17.

With regard to the radially outer cooling channel 24, it is provided that it is arranged radially adjacent to and further outward than the slot base 18, with the radially outer cooling channel 24 and slot base 18 or stator slot 15 extending collinearly along the radial direction 11. The radially outer cooling channel 24 is arranged directly adjacent to the slot base 18. The radially outer cooling channel 24 extends along the longitudinal direction 10 through the laminated core 14, in fact, along its entire longitudinal extent.

Further, the radially outer cooling channel 25 is arranged laterally adjacent to the slot base 18 and extends centrally between two adjacent teeth 13, so that its cooling effect extends over two adjacent stator slots 15 or windings 17 arranged therein. Further, the radially outer cooling channel 25 extends so far inward, relative to the radial direction 11, that it overlaps the stator slot 15. The radially outer cooling channel 24 extends along the longitudinal direction 10 through the laminated core 14 and through one of the teeth 13, namely through the teeth 13 entire longitudinal extent.

With regard to the radially inner cooling channel 26, it is provided that radially inner cooling channel 26 runs through a radially inner section of the stator slot 15 which forms a leakage slot 27. The leakage slot 27 is laterally delimited by the radial inner, widened sections of the teeth 13 relative to the shoulders 19. Radially on the outside, the leakage slot 27 is delimited by the winding 17 or insulation paper 22. Radially on the inside, the leakage slot 27 is delimited by a sleeve 28 which is arranged on a radial inner circumference of the stator 4, that is to say on the radially inner end faces of the teeth 13, and seals the radially inner cooling channel 26 in a fluid-tight manner towards an air gap not shown in detail in the figures, which is arranged between the stator 4 and the rotor 3. For this purpose, sealing devices not shown in the figures, such as sealing strips, are provided between the radially inner, front ends of the teeth 13 and sleeve 28.

Figure 4:
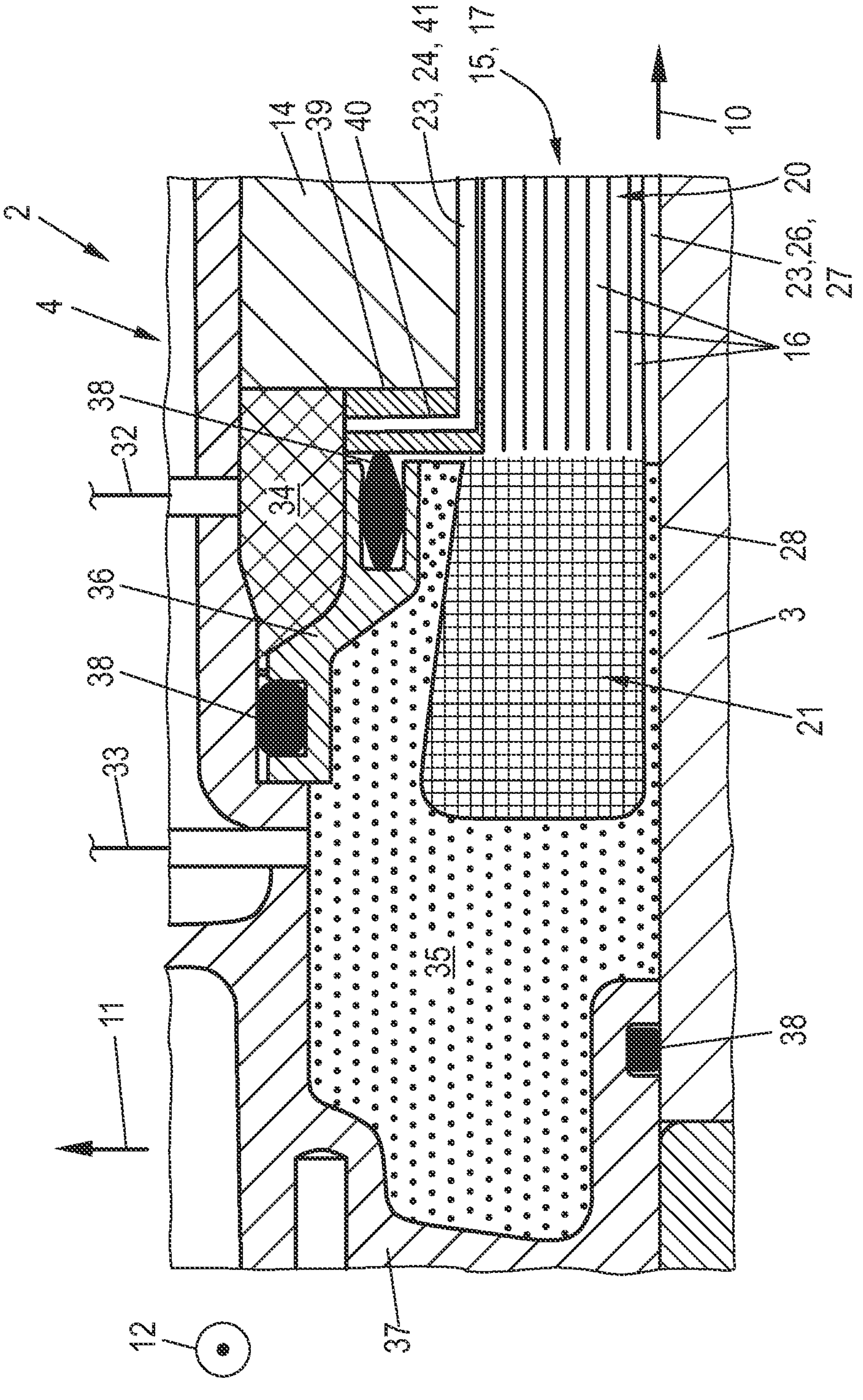
FIG. 4 shows an enlarged representation of the left area of the sectional representation shown in FIG. 2.

Details regarding the specific guidance of the fluid will be explained below with reference to FIGS. 2 and 4. The electric machine 2 has a cooling system 29, by which the cooling fluid can be guided through cooling channels 23. The cooling system 25 forms a cooling circuit, the guidance of the cooling fluid being indicated by arrows in FIG. 2. In the present case, the cooling fluid is a cooling liquid, for example, oil or water.

Supplying and discharging the cooling fluid to or from the stator 4 takes place at a supply section 30, which is indicated in FIG. 2 by a dashed oval. The supply section 30 is arranged at the front on one of the two axial end sections of the stator 4 or the laminated core 14. For example, it is conceivable that in order to supply the stator 4 with the cooling fluid, a connection interface designed as a common component is provided in the area of the supply section 30. The cooling system 29 has a conveying device 31, which is a cooling fluid pump, a supply line 32 leading from the conveying device 31 to the supply section 30, and a discharge line 33 leading from the supply section 30 to the conveying device 31.

In the area of the supply section 30, a supply chamber 34 and a discharge chamber 35 are provided, which are fluidically separated from one another via a sealing ring 36 arranged in the supply section 30. The sealing ring 36 is made, for example, of a plastic and extends concentrically about the axis of rotation 9, which therefore also applies to the chambers 34, 35. Furthermore, the chambers 34, 35 are delimited by sections 37 of the housing 6. To achieve fluid tightness, the sealing elements 38 are provided, which can be O-rings made of an elastomer. For better recognizability, the supply chamber 34 is marked in FIG. 4 by cross-hatching and the discharge chamber 35 by dotted hatching.

Another aspect relevant to fluid guidance relates to a multi-piece winding support 39 made of plastic and arranged on each respective tooth 13, by which the conductor wire 16 of each respective winding 17 is held in position. For this purpose, the winding carrier 39 has guide slots for secure and stable guidance of the conductor wire 16. Thus, the structure of the windings 15 is predefined by each respective winding carrier 39. In the present case, the winding carrier 39 comprises two winding carrier components which are fastened to the axial front ends of each respective tooth 13. The winding carrier 39 has fluid guide channels 40, which are explained in more detail below.

The cooling fluid thus passes from the conveying device 31 into the supply chamber 34 via the supply line 32, the supply chamber 34 in turn opening into a supply channel 41 of the stator 4 via a first fluid guide channel 40 of the winding carrier 39. In the present case, the radially outer cooling channel 24 and further the radially outer cooling channel 25 are provided as the supply channel 41, with only the radially outer cooling channel 24 being visible in FIGS. 2 and 4 due to the course of the sectional plane. The cooling fluid flows through the supply channel 41 or the radially outer cooling channel 24 through the entire axial length of the laminated core 14 and opens into a transfer chamber 42 via a second fluid guide channel 40 of the winding carrier 39. The transfer chamber 42 in turn opens into a discharge channel 43, which, in the present case, is provided as the radial inner cooling channel 26. There, the cooling fluid flows again over the entire axial length of the laminated core 14 to the area of the supply section 30, namely into the discharge chamber 35. From there, the cooling fluid returns to the conveying device 31 via the discharge line 33. As part of the cooling fluid guidance, it is therefore provided that that the cooling fluid flowing through the supply channel 41 flows in the opposite direction relative to the discharge channel 43.

Details regarding the transfer chamber 42 will be explained below. The transfer chamber 42 is provided in the area of a transfer section 44, which is the axial end section of the stator 4 or the laminated core 14 opposite the supply section 30. The transfer section 44 is indicated in FIG. 2 by a dotted oval. The transfer chamber 42 is delimited by sections 37 of the housing 6 and indicated in FIG. 2 by circular hatching. The transfer chamber 42 extends annularly and concentrically about the axis of rotation 9. The cooling fluid floods the transfer chamber 42 as well as the discharge chamber 35, so that the winding head arranged in these chambers 35, 42 is cooled accordingly.

In contrast to the embodiment just described, it can alternatively be provided with regard to the guidance of the cooling fluid that the fluid guidance directions are reversed. Referring to FIG. 2, the arrows indicating the direction of the fluid guidance can therefore point in the opposite direction. In this case, the area forming the supply chamber 34 in the embodiment just explained forms the discharge chamber 35, and vice versa.

German patent application no. 10 2023 106331.6, filed Mar. 14, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, designed as an internal rotor, the electric machine comprising:

a rotor; and a stator, the stator having a plurality of teeth each extended along a radial direction and along a longitudinal direction of the electric machine, each of the teeth configured to carry a winding wound around the teeth, wherein stator slots extend between two adjacent teeth and along the longitudinal direction through which the windings extend, and wherein the windings are configured to be coolable by a cooling fluid guided in a plurality of cooling channels formed in the stator and extending along the stator slots, wherein the plurality of cooling channels includes a respective tooth-based cooling channel arranged in each tooth laterally adjacent to and between each pair of adjacent slot bases of adjacent stator slots such that at least one section of at least one of the plurality of windings at a radially outer end of the stator slot is positioned between a respective pair of the radially outer tooth-based cooling channels and can be cooled on both sides thereof, wherein a radially outer end of each of the tooth-based cooling channels is located radially outward of the adjacent slot bases of the adjacent stator slots, and wherein a radially inward end of each of the tooth-based cooling channels is located radially inward of the adjacent slot bases of the stator slots, and wherein the plurality of cooling channels further includes at least one respective radially outer slot-based cooling channel and at least one respective radially inner slot-based cooling channel which are each aligned with a respective one of the stator slots and which are distinct from and offset from the tooth-based cooling channels, the at least one radially outer slot-based cooling channel running offset from the stator slot and adjacent to a radially outer section of the respective winding, and the at least one radially inner slot-based cooling channel running directly adjacent to a radially inner section of the respective winding.

2. The electric machine according to claim 1, wherein a central portion of each tooth-based cooling channel is arranged laterally adjacent to the adjacent slot bases of the adjacent stator slots.

3. The electric machine according to claim 1, wherein the at least one radially outer slot-based cooling channel, which is offset from the stator slot, is arranged radially adjacent to the slot base and runs centrally between two adjacent teeth.

4. The electric machine according to claim 1, wherein the radially inner slot-based cooling channel runs through a radially inner section of the stator slot which forms a leakage slot.

5. The electric machine according to claim 4, wherein a sleeve arranged on a radial inner circumference of the stator is configured to seal the radially inner slot-based cooling channel in a fluid-tight manner towards an air gap arranged between the stator and the rotor.

6. The electric machine according to claim 1, further comprising a cooling system, by which the cooling fluid can be supplied to the cooling channels and discharged from the cooling channels, the supply and discharge of the cooling channels taking place at a supply section arranged at a front side on one of two axial end sections of the stator.

7. The electric machine according to claim 6, wherein a supply chamber and a discharge chamber are arranged in the area of the supply section, a transfer chamber being arranged at the front of the stator in the area of a transfer section which is an axial end section of the stator opposite the supply section, wherein a supply line arranged downstream of a conveying device opens into the supply chamber, wherein the supply chamber opens into the supply channel, wherein the supply channel opens into the transfer chamber, wherein the transfer chamber opens into the discharge channel, wherein the discharge channel opens into the discharge chamber, wherein the discharge chamber opens into a discharge line arranged upstream of the conveying device.

8. The electric machine according to claim 7, wherein the supply chamber and the discharge chamber are fluidly separated from one another via a sealing ring arranged in the supply section.

9. The electric machine according to claim 7, wherein the windings each have winding heads, with one of the winding heads of at least one of the windings in each case being arranged in the transfer chamber, and the other respective winding head of this winding in each case being arranged in the supply chamber and/or in the discharge chamber.

10. The electric machine according to claim 7, wherein at least one winding carrier is arranged around or on one of the teeth and guides the winding, wherein the cooling fluid can be conducted from the supply chamber into the supply channel and/or from the supply channel into the transfer chamber and/or from the transfer chamber into the discharge channel and/or from the discharge channel into the discharge chamber through at least one fluid guide channel of the winding carrier.

11. A motor vehicle, comprising an electric machine according to claim 1.

12. The electric machine according to claim 1, wherein at least one of the cooling channels is a supply cooling channel and at least one of the cooling channels is a discharge channel, the cooling fluid in the supply channel configured to flow in an opposite direction with regard to the discharge channel.

13. A stator for an electric machine designed as an internal rotor, the stator comprising:

a plurality of teeth each extending along a radial direction and along a longitudinal direction of the stator, each of the teeth carrying a winding wound around the teeth; and stator slots extending between two adjacent teeth and along the longitudinal direction through which the windings extend, the windings being coolable by a cooling fluid which can be guided in a plurality of cooling channels formed in the stator and extending along the stator slots, wherein the plurality of cooling channels includes a respective tooth-based cooling channel arranged in each tooth laterally adjacent to and between each pair of adjacent slot bases of adjacent stator slots such that at least one section of at least one of the plurality of windings at a radially outer end of the stator slot is positioned between a respective pair of the radially outer tooth-based cooling channels and can be cooled on both sides, wherein a radially outer end of each of the tooth-based cooling channels is located radially outward of the adjacent slot bases of the adjacent stator slots, and wherein a radially inward end of each of the tooth-based cooling channels is located radially inward of the adjacent slot bases of the stator slots, and wherein the plurality of cooling channels further includes at least one respective radially outer slot-based cooling channel and at least one respective radially inner slot-based cooling channel which are each aligned with a respective one of the stator slots and which are distinct from and offset from the tooth-based cooling channels, the at least one radially outer slot-based cooling channel running offset from the stator slot and adjacent to a radially outer section of the respective winding, and the at least one radially inner slot-based cooling channel running directly adjacent to a radially inner section of the respective winding.

* * * * *